F. E. BERTRAND.
SOLE CHANNELING TOOL.
APPLICATION FILED APR. 15, 1911.
1,030,706.
Patented June 25, 1912.
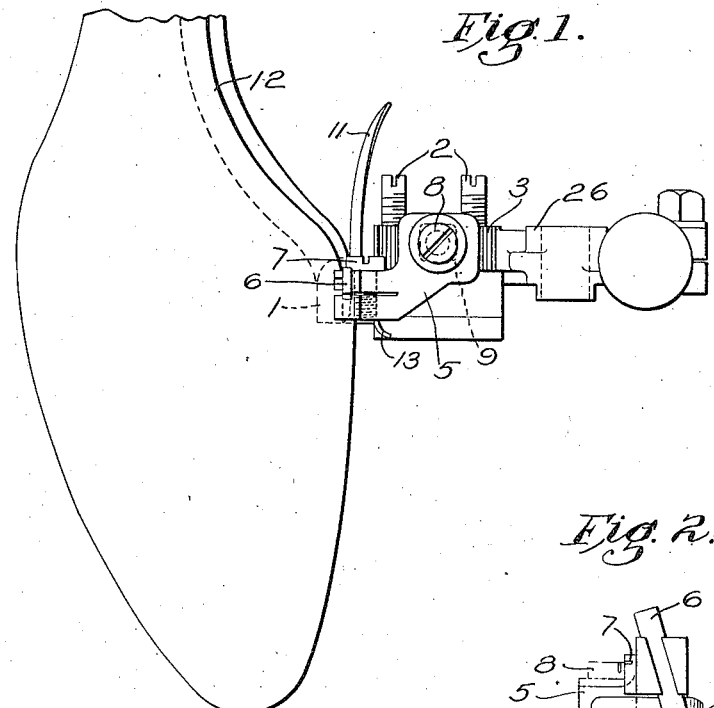
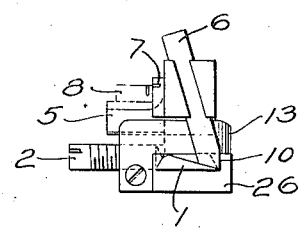
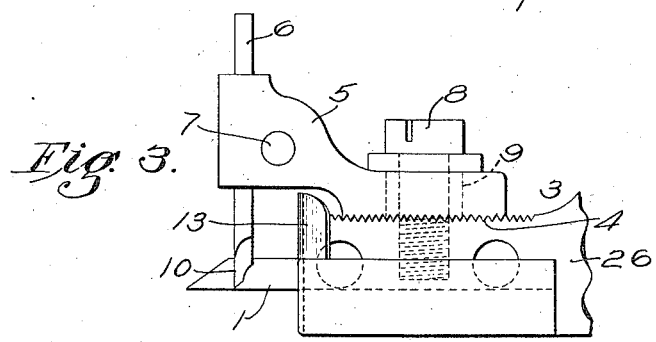
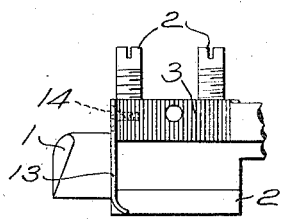
Witnesses:
Powell F. Hatch
Warren G. Ogden
Inventor:
Frederic E. Bertrand
by his attorneys
Phillips, Van Everen & Fish

UNITED STATES PATENT OFFICE.

FREDERIC E. BERTRAND, OF SWAMPSCOTT, MASSACHUSETTS, ASSIGNOR TO UNITED SHOE MACHINERY COMPANY, OF PATERSON, NEW JERSEY, A CORPORATION OF NEW JERSEY.

SOLE-CHANNELING TOOL.

1,030,706.      Specification of Letters Patent.      Patented June 25, 1912.

Application filed April 15, 1911. Serial No. 621,333.

*To all whom it may concern:*

Be it known that I, FREDERIC E. BERTRAND, a citizen of the United States, residing at Swampscott, in the county of Essex and State of Massachusetts, have invented certain new and useful Improvements in Sole-Channeling Tools; and I do hereby declare the following to be a full, clear, and exact description of the invention, such as will enable others skilled in the art to which it appertains to make and use the same.

This invention relates to knives for sole channeling machines, and more particularly to lip forming knives for preparing insole blanks for reinforced insole work, such, for instance, as "gem" work.

In preparing an insole for gem work, an edge knife is used to slit the edge of the sole to form a lip which is afterward turned up, leaving the thin feather on the margin of the sole. The surface of the sole and the lip are then reinforced by being covered with canvas. As is well known by experienced shoe makers, the best outline in the finished shoe is obtained by varying the width of the feather at proper points on the sole which, however, varies the height of the lip turned up. In order that the inseam trimming knife may not cut the canvas on the lip, which is liable to occur with a lip of uneven height, it is usual to make the lip of a uniform height before the canvas is applied. To this end a lip trimming knife is employed arranged to cut off any surplus width of the lip so that when it is turned up there will be no variation in its height throughout its length. The lip trimming knife preferably is arranged to extend upward from the edge knife at a right angle and in order that the width of the lip may not be varied on the curves of the periphery of the sole by reason of one knife edge cutting in advance of the other, the edges of the two knives are placed in a substantially vertical plane. Several objections to the use of knives of this character, as heretofore constructed, have been observed. One objection is that when the lip trimming knife is removed for grinding, it requires careful adjustment to replace the knife at its original distance from the end of the edge knife. If the trimming knife is not accurately positioned, the width of lip on the next sole operated on will vary from the width provided on former soles. Another difficulty which has been encountered is that when, after grinding, the trimming knife is being readjusted in the direction of the line of feed to bring the edges of the two knives into a substantially vertical plane, the relative position of the knives across the line of feed, determining the width of lip, is lost. Other defects, which have been apparent, include the constant adjustment of the trimming knife in the direction of the line of feed made necessary by frequent grinding, and the liability of the knife to become clogged by the chips cut from the sole.

The objects of the present invention are to remedy these defects.

To the accomplishment of these objects, and such others as may hereinafter appear, the invention comprises the features and combinations of parts hereinafter described and particularly pointed out in the appended claims.

The preferred form of the invention is shown in the accompanying drawings, in which—

Figure 1 is a plan of the lip forming knife operating upon a sole; Fig. 2 is an end elevation; Fig. 3 is a front elevation on an enlarged scale; and Fig. 4 is a plan of the end of the edge knife block with the trimming knife block removed.

An example of channeling machines to which the knife of the present invention may be applied is illustrated and described in Letters Patent of the United States to Frederic E. Bertrand, No. 1,023,801, dated April 23, 1912, to which reference may be had.

In the embodiment of the invention illustrated in the drawings, the knife block 26 is identical with the knife block shown in the hereinbefore mentioned patent, except in the details which hereinafter will be particularly described. An edge slitting knife 1 is adjustably secured in a slot in the block by set screws 2. The upper surface of the block is scored to form teeth 3 (see Figs. 1 and 3) which engage similar teeth 4 on the under side of a lip trimming knife block 5. It is desirable that the teeth 3 and 4 be made quite fine in order to permit delicate lateral adjustment, that is, toward or from the end of the edge slitting knife, the size of the teeth shown in the drawings having been exaggerated for convenience in delineation. The block 5 projects over the edge knife and the projecting end is split and provided with an angular slot (Fig. 2) in which a lip trimming knife 6 is clamped by a screw 7.

The lip trimming knife block is secured to the edge knife block by a headed screw 8 threaded into the lower block and passing through a relatively large clearance hole 9 in the block 5. The lateral position of the trimming knife relative to the edge knife, for determining the width of the lip, may be determined by loosening the screw 8 enough to permit the teeth 3 and 4 to be disengaged and then moving the block 5 toward or from the end of the edge knife. After an adjustment the teeth are reëngaged and clamped by the screw 8.

When the trimming knife is removed for sharpening, which may be accomplished by loosening the screw 7, it can be instantly replaced at its original distance from the end of the edge knife, thus insuring no variation in the width of the lip. Grinding the trimming knife often brings its cutting edge 10 out of the vertical plane (see Fig. 2) of the cutting edge of the knife 1. As the operator acquires skill in grinding the knife, he will be able to grind enough off the end contacting with the edge knife to lower the knife 6 sufficiently when replaced to cause enough of an advance of its edge 10, which has also been ground back, transversely across and toward the edge of the knife 1 to maintain the desired vertical alinement of these edges. This automatic adjustment of the cutting edges of the two knives is made possible by the use of the knife holding slot in the block 5 arranged at an angle to the face of the knife 1.

If the exact amount required to automatically adjust the trimming knife has not been removed from the end of the knife 6, it is manually adjusted to bring the two cutting edges into the same vertical plane by slightly loosening the screw 8 and then moving the trimming knife block in the direction of the line of feed of the sole. As the screw 8 is not loosened enough in accomplishing this adjustment to disengage the teeth 3 and 4, they will restrain the block 5 from any movement toward or from the end of the edge knife which would disturb its predetermined position relative to the end of that knife.

In order that the trimmed-off portion 11 of the lip 12 (Fig. 1) may not clog the machine by jamming under the overhanging portion of the trimming knife block 5, a guide piece 13 is secured to the end of the edge knife block 26 by a screw 14. The work engaging face of the guide piece is flush with the end of the block 26 and extends nearly up to the overhanging portion of the block 5 and forward in advance of the cutting edge of the knife 1. By this construction, the chips from the lip have a smooth bearing surface wherever they may strike and there is no possibility of the passage between the trimming knife and the knife blocks becoming clogged and thereby preventing a free feeding movement of the sole.

While it is preferred to employ the specific construction and arrangement of parts shown and described, it will be understood that this construction and arrangement is not essential except in so far as is specified in the claims.

What is claimed as new, is:—

1. A lip forming knife, having, in combination, an edge knife block, a lip trimming knife block adjustably secured to the edge knife block, and means for permitting an adjustment of the trimming knife block in the direction of the line of feed of the work while preventing movement of said block in a direction across the line of feed, substantially as described.

2. A lip forming knife, having, in combination, an edge knife block, a lip trimming knife block adjustably carried by the edge knife block, interlocking teeth extending in the direction of the line of feed of the work on the adjacent surfaces of the blocks, and means for engaging the teeth and clamping the two blocks together, substantially as described.

3. A lip forming knife, having, in combination, a block carrying a projecting edge knife, a second block adjustably mounted on the edge knife block and overhanging the edge knife, a lip trimming knife carried by the second block, and a chip guide fixed to the end of the edge knife block between the edge knife and lip trimming knife block and projecting above and in advance of the cutting edge of the edge knife, substantially as described.

4. A lip forming knife, having, in combination, a block carrying an edge knife, a block carrying a lip trimming knife, and means for securing the trimming knife block to the edge knife block, permitting adjustment both longitudinally and transversely of the edge knife, substantially as described.

5. A lip forming knife, having, in combination, an edge slitting knife, a lip trimming knife coöperating therewith to determine the width of the lip produced by the edge slitting knife, and means permitting an adjustment of the lip trimming knife longitudinally and transversely of the edge slitting knife and toward and from the face of said knife, substantially as described.

6. A lip forming knife, having, in combination, a block carrying a horizontally projecting edge knife, a second block on the edge knife block overhanging and adjustable both longitudinally and transversely of the edge knife, and a lip trimming knife secured in the overhanging portion of the second block and adjustable toward and from the face of the edge knife, substantially as described.

FREDERIC E. BERTRAND.

Witnesses:
    JOHN H. RIGBY,
    CHESTER E. ROGERS.